United States Patent
Amamiya et al.

(10) Patent No.: US 7,107,869 B2
(45) Date of Patent: Sep. 19, 2006

(54) SHIFT CONTROL SYSTEM AND SHIFT CONTROL METHOD

(75) Inventors: Sumiko Amamiya, Okazaki (JP);
Tatsuya Ozeki, Torrance, CA (US);
Shigeru Kamio, Nagoya (JP); Yasuhiro Nakai, Kariya (JP); Kazuo Kawaguchi, Kasugai (JP); Yasuo Shimizu, Toki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 99 days.

(21) Appl. No.: 10/819,303

(22) Filed: Apr. 7, 2004

(65) Prior Publication Data
US 2004/0200301 A1 Oct. 14, 2004

(30) Foreign Application Priority Data
Apr. 9, 2003 (JP) ............... 2003-105824

(51) Int. Cl.
*F16H 59/00* (2006.01)
*B60K 20/00* (2006.01)
(52) U.S. Cl. ..................... 74/335; 74/473.21
(58) Field of Classification Search ............... 74/335, 74/473.21, 473.25, 473.23; 477/906, 34, 477/125; 701/60, 62, 64
See application file for complete search history.

(56) References Cited

U.S. PATENT DOCUMENTS

| | | | | |
|---|---|---|---|---|
| 4,856,360 A | * | 8/1989 | Yoshimura et al. | ............ 74/335 |
| 5,094,115 A | * | 3/1992 | Michihira et al. | ............ 74/335 |
| 6,105,448 A | * | 8/2000 | Borschert et al. | ............ 74/335 |
| 6,230,576 B1 | * | 5/2001 | Yamada et al. | ............ 74/335 |
| 6,249,734 B1 | * | 6/2001 | Ota | ............ 701/51 |
| 6,499,371 B1 | * | 12/2002 | Tsuzuki et al. | ............ 74/335 |
| 6,564,133 B1 | * | 5/2003 | Ebashi | ............ 701/62 |
| 2001/0015109 A1 | * | 8/2001 | Yamamoto | ............ 74/335 |

FOREIGN PATENT DOCUMENTS

| | | |
|---|---|---|
| JP | 2002-310294 | 10/2002 |
| JP | 2002-323127 | 11/2002 |
| JP | 2002-349702 | 12/2002 |

\* cited by examiner

*Primary Examiner*—Roger Pang
(74) *Attorney, Agent, or Firm*—Oblon, Spivak, McClelland, Maier & Neustadt, P.C.

(57) ABSTRACT

A shift control system rotates an actuator to allow a wall of a detent plate and a roller of a detent spring to contact each other and then detects the position of contact so as to detect the position of the wall of the detent plate. After the wall position is determined, the actuator is driven in the direction opposite to the wall until the actuator reaches a position located before the wall position and distant therefrom by a predetermined amount, in order to cancel flexure or extension of the detent spring that is caused when the detent spring is pushed against the wall of the detent plate. Accordingly, such a situation where the shift position is moved by the recovery force of the detent spring can be avoided.

27 Claims, 15 Drawing Sheets

FIG. 6

| PRECEDING TRIP | | | WALL POSITION | |
|---|---|---|---|---|
| SHIFT RANGE | ACTUAL ROTATABLE AMOUNT | ECU INSTRUCTION | P WALL POSITION | NON-P WALL POSITION |
| P RANGE | DETECTED | | DETECT | NOT DETECT |
| P RANGE | UNKNOWN | | DETECT | DETECT |
| NON-P RANGE | DETECTED | | NOT DETECT | DETECT |
| NON-P RANGE | UNKNOWN | | DETECT | DETECT |
| UNKNOWN | | P RANGE | DETECT | DETECT |
| UNKNOWN | | NON-P RANGE | DETECT | DETECT |

FIG. 7

| DETECTION OF WALL POSITION | | ACTUAL ROTATABLE AMOUNT | METHOD OF CALCULATING TARGET ROTATIONAL POSITION | |
|---|---|---|---|---|
| P WALL POSITION | NON-P WALL POSITION | | | |
| DETECTED | DETECTED | DETECTED | P TARGET ROTATIONAL POSITION | NON-P TARGET ROTATIONAL POSITION |
| DETECTED | UNKNOWN | DETECTED | P WALL POSITION + MARGIN | NON-P WALL POSITION − MARGIN |
| DETECTED | UNKNOWN | UNKNOWN | P WALL POSITION + MARGIN | P WALL POSITION + ACTUAL ROTATABLE AMOUNT − MARGIN |
| UNKNOWN | DETECTED | DETECTED | NON-P WALL POSITION − ACTUAL ROTATABLE AMOUNT + MARGIN | P WALL POSITION + DESIGNED ROTATABLE AMOUNT |
| UNKNOWN | DETECTED | UNKNOWN | NON-P WALL POSITION − ACTUAL ROTATABLE AMOUNT + MARGIN | NON-P WALL POSITION − MARGIN |
| UNKNOWN | UNKNOWN | UNKNOWN | NON-P WALL POSITION − DESIGNED ROTATABLE AMOUNT | NON-P WALL POSITION − MARGIN |

US 7,107,869 B2

SHIFT CONTROL SYSTEM AND SHIFT CONTROL METHOD

This nonprovisional application is based on Japanese Patent Application No. 2003-105824 filed with the Japan Patent Office on Apr. 9, 2003, the entire contents of which are hereby incorporated by reference.

BACKGROUND OF THE INVENTION

1. Field of the Invention

The present invention relates to a shift control system making a switch between shift ranges of a transmission via an actuator.

2. Description of the Background Art

A shift control system based on a technique sometimes called "shift-by-wire" has been known. The shift control system switches the shift range of an automatic transmission under electrical control according to operation of a shift lever by a driver. Under this shift control system, when the driver operates the shift lever, a shift-range switch instruction is generated to energize an actuator and thereby rotate a detent plate. When the detent plate reaches a predetermined rotational position, the detent plate and a detent spring engage with each other to determine a shift position. The detent plate engaging with a roller of the detent spring has a plurality of depressions corresponding respectively to different shift ranges (see Japanese Patent Laying-Open No. 2002-323127 for example).

When the shift position is changed by the above-described shift control system, the roller of the detent spring climbs over a protrusion of the detent plate and then down to be fit in a desired depression so that a desired shift position is determined. It is thus necessary to stop the detent plate at a position which allows the roller to be fit surely in the depression. If the detent plate is incorrectly positioned, the roller could be pushed against the protrusion or any of the laterally outermost walls of the detent plate and consequently the detent plate stops while the detent spring is flexed. In this case, the recovery force of the detent spring causes needless rotation of the detent plate so that the shift position could be moved to an undesired position.

SUMMARY OF THE INVENTION

An object of the present invention is to provide a shift control system and a shift control method by which the shift position can more reliably be determined.

According to an aspect of the present invention, a shift control system switching a shift range via an actuator includes a shift component driven by the actuator for switching the shift range, a restriction component for restricting rotation in a predetermined direction of the actuator in a predetermined shift range, a rotation control unit for rotating the actuator, and a return control unit for rotating, when the actuator is rotated by the rotation control unit in the direction in which rotation of the actuator is restricted by the restriction component, the actuator by a predetermined amount from a reference position of the actuator corresponding to a predetermined shift range, in an opposite direction which is opposite to the direction in which restriction is effected by the restriction component. The shift component and the restriction component may be integrated into one structure, or the restriction component may be a part of the shift component.

With the shift control system of this aspect, even when the shift component operates to rotate from the reference position in the direction opposite to the direction in which rotation is restricted by the restriction component, the actuator is returned in advance to a position which allows this operation to be cancelled. Accordingly, such a situation where the shift component rotates to cause the shift position to move to an undesired position can be prevented.

According to another aspect of the present invention, a shift control system switching a shift range via an actuator includes a shift component driven by the actuator for switching the shift range, a restriction component for restricting rotation in a predetermined direction of the actuator in a predetermined shift range, a rotation control unit for rotating the actuator, a count unit for obtaining a count value according to a rotational amount of the actuator, a position setting unit for setting, when the actuator is rotated by the rotation control unit in the direction in which rotation of the actuator is restricted by the restriction component, a reference position of the actuator corresponding to the predetermined shift range based on a state of the count value obtained by the count unit, and a return control unit for rotating, after the reference position is set by the position setting unit, the actuator by a predetermined amount from the reference position, in an opposite direction which is opposite to the direction in which rotation of the actuator is restricted by the restriction component.

With the shift control system of this aspect, even when the shift component operates to rotate, after the reference position is set by the position setting unit, from the reference position in the direction opposite to the direction in which rotation is restricted by the restriction component, the actuator is returned in advance to a position which allows this operation to be cancelled. Accordingly, such a situation where the shift component rotates to cause the shift position to move to an undesired position can be prevented.

The shift component includes a detent plate rotated by the actuator and a detent spring engaging with a depression of the detent plate that is formed correspondingly to a shift range and thereby fixing a shift position, and the return control unit may rotate the actuator to a position which allows flexure or extension of the detent spring to be cancelled.

The position setting unit may detect an abnormality, when the actuator is rotated by the rotation control unit in setting the reference position, from the fact that the actuator is returned in the opposite direction by more than the predetermined amount. The return control unit may detect an abnormality, when the actuator is rotated by the predetermined amount from the reference position, from the fact that the actuator is rotated by more than the predetermined amount. Further, the return control unit may detect an abnormality, when the actuator is rotated by the predetermined amount from the reference position under return control, from the fact that the return control is not finished even after a predetermined period of time. In this way, any abnormality of such a component as the actuator or an encoder which obtains a rotational position of the actuator can accurately be detected. The situation where normal shift control fails due to any abnormality can thus be prevented.

According to still another aspect of the present invention, a shift control method for switching a shift range via an actuator includes the steps of rotating by the actuator a shift component for switching the shift range, stopping rotation of the actuator by a restriction component for restricting rotation in a predetermined direction of the actuator in a predetermined shift range, detecting a reference position corresponding to the predetermined shift range based on a position where the stopping is effected, and thereafter rotating the actuator by a predetermined amount in the opposite direction. According to the shift control method of this aspect, even when the shift component operates to rotate from the reference position in the direction opposite to the direction in which rotation is restricted by the restriction component, the actuator is returned in advance to a position which allows this operation to be cancelled. Accordingly, such a situation where the shift component rotates from the reference position to move the shift position to an undesired position can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows exemplary control of detection of the wall position.

FIG. 7 shows an exemplary method of calculating a target rotational position of the actuator.

DESCRIPTION OF THE PREFERRED EMBODIMENTS

According to a first embodiment, descriptions are first given of an entire operation of a shift control system energizing an actuator according to a shift-position switch instruction to rotate a detent plate to a predetermined target range and accordingly allow the detent plate to engage with a detent spring, thereby fixing the shift position, as well as of a principle of a learning operation for determining the target range mentioned above. Then, according to a second embodiment, descriptions are given of a method for return control which is a feature of the present invention, namely a method for canceling flexure or extension of the detent spring by returning the actuator by a predetermined amount from a reference position of the actuator that corresponds to a shift position, as well as of a method of detecting an abnormality in respective processes of the learning operation and the return control.

First Embodiment

Figure 1:
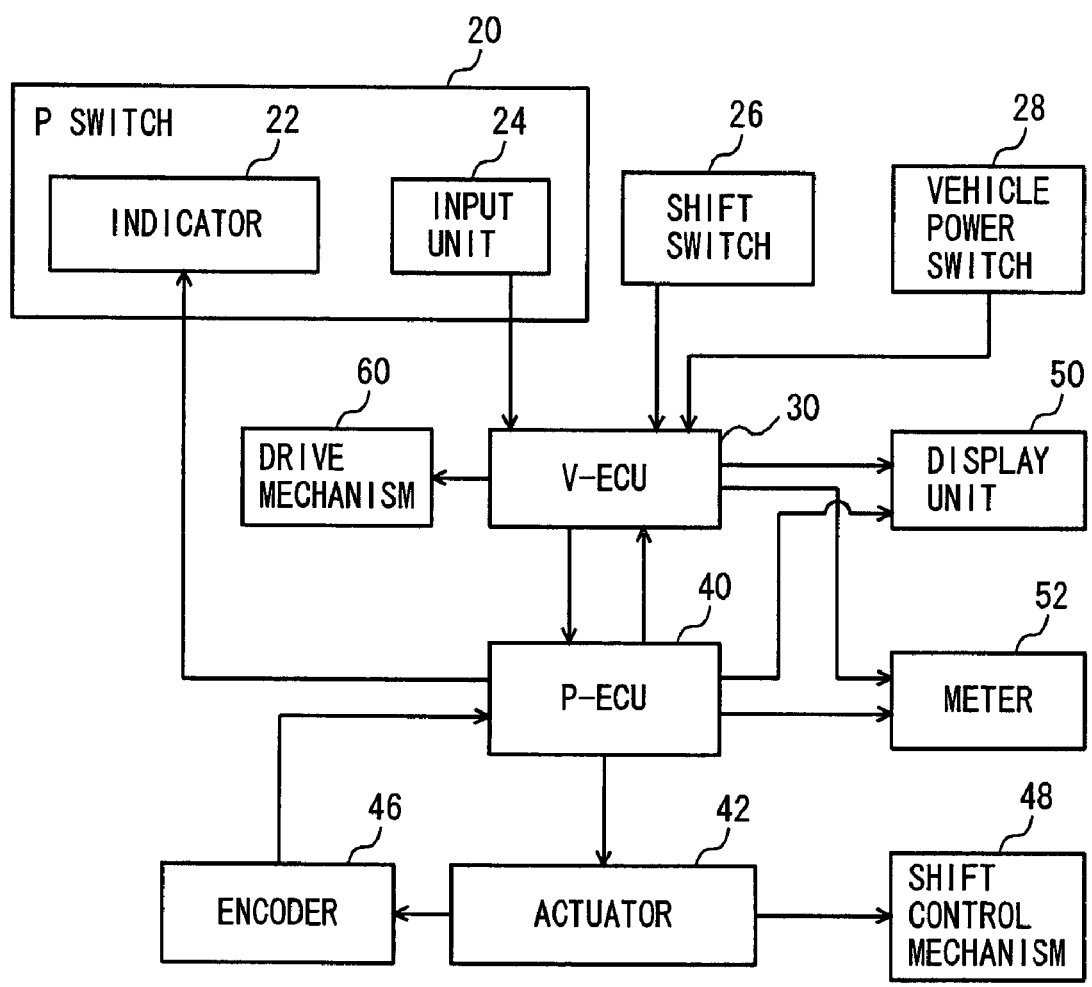
FIG. 1 shows a configuration of a shift control system according to a first embodiment.

FIG. 1 shows a configuration of a shift control system 10 according to the first embodiment of the present invention. Shift control system 10 of this embodiment is used for switching the shift range of a vehicle. Shift control system 10 includes a P switch 20, a shift switch 26, a vehicle power switch 28, a vehicle control unit (hereinafter referred to as "V-ECU") 30, a parking control unit (hereinafter "P-ECU") 40, an actuator 42, an encoder 46, a shift control mechanism 48, a display unit 50, a meter 52, and a drive mechanism 60. Shift control system 10 functions as a shift-by-wire system which switches the shift range under electrical control. Specifically, shift control mechanism 48 is driven by actuator 42 to switch the shift range.

Vehicle power switch 28 is a switch for turning on and turning off the electric power supply of the vehicle. An instruction from a user, a driver for example, that is received by vehicle power switch 28 is transmitted to V-ECU 30. For example, in response to turning-on of vehicle power switch 28, electric power is supplied from a battery (not shown) to operate shift control system 10.

P switch 20 is used to change the shift range between the parking range (hereinafter "P range") and any range except for the parking range (hereinafter "non-P range") and includes an indicator 22 for showing a state of the switch to the driver as well as an input unit 24 for receiving an instruction from the driver. The driver inputs through input unit 24 an instruction to switch the shift range to the P range. Input unit 24 may be a momentary switch. The instruction received by input unit 24 is transmitted to V-ECU 30 and to P-ECU 40 through V-ECU 30.

P-ECU 40 controls operation of actuator 42 which drives shift control mechanism 48 in order to change the shift range between the P range and the non-P range, and shows a current state of the shift range on indicator 22. If the driver presses input unit 24 when the shift range is the non-P range, P-ECU 40 switches the shift range to the P range and shows that the current shift range is the P range on indicator 22.

Actuator 42 is constructed of a switched reluctance motor (hereinafter "SR motor") and drives shift control mechanism 48 in response to an instruction from P-ECU 40. Encoder 46 rotates together with actuator 42 to detect a rotational state of the SR motor. Encoder 46 of this embodiment is a rotary encoder which outputs A-phase, B-phase and Z-phase signals. P-ECU 40 receives signals that are output from encoder 46 to know a rotational state of the SR motor and thereby control energization for driving the SR motor.

Shift switch 26 is a switch used for switching the shift range to the drive range (D), the reverse range (R), the neutral range (N) and the brake range (B) for example or canceling the P range when the P range is selected. An instruction from the driver that is received by shift switch 26 is transmitted to V-ECU 30. Based on the instruction from the driver, V-ECU 30 controls drive mechanism 60 to change the shift range and shows the current state of the shift range on meter 52. Although drive mechanism 60 here is constructed of a continuously-variable transmission mechanism, the drive mechanism may be constructed of an automatic gearbox transmission mechanism.

V-ECU 30 entirely controls operation of shift control system 10. Display unit 50 indicates instructions and warnings for example to the driver that are issued by V-ECU 30 or P-ECU 40. Meter 52 indicates a state of equipment of the vehicle and a state of the shift range for example.

Figure 2:
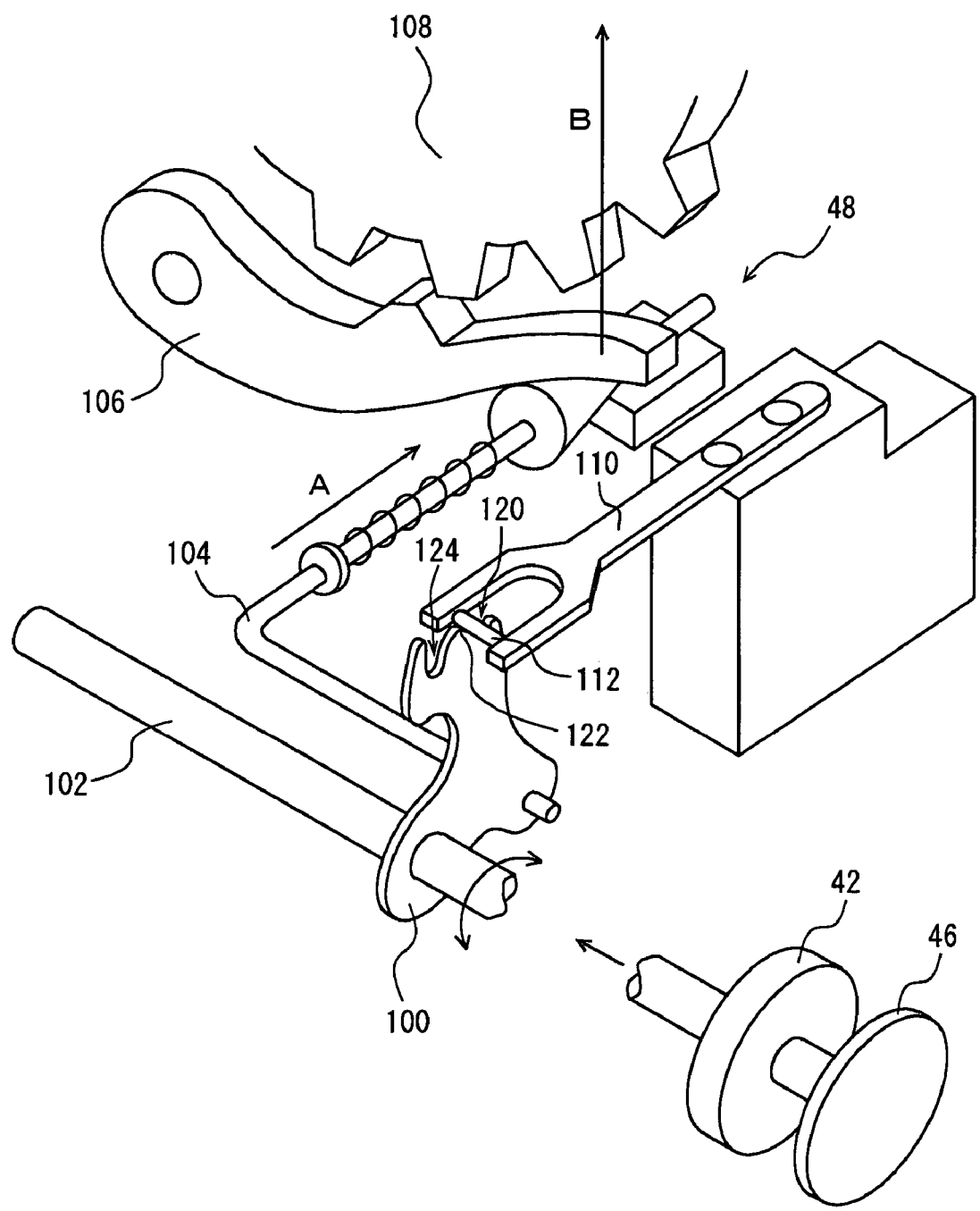
FIG. 2 shows a configuration of a shift control mechanism.

FIG. 2 shows a configuration of shift control mechanism 48. In the following description, "shift range" refers to the P range or the non-P range and does not include the R, N, D and B ranges included in the non-P range. Shift control mechanism 48 includes a shaft 102 rotated by actuator 42, a detent plate 100 rotating according to the rotation of shaft 102, a rod 104 operating according to the rotation of detent plate 100, a parking gear 108 fixed to an output shaft of a transmission (not shown), a parking lock pole 106 for locking parking gear 108, and a detent spring 110 and a roller 112 restricting the rotation of detent plate 100 to fix the shift range. Detent plate 100 functions as shift means driven by actuator 42 for switching the shift range. Shaft 102, detent plate 100, rod 104, detent spring 110 and roller 112 function as a shift switching mechanism. Further, encoder 46 functions as count means obtaining a count value according to a rotational amount of actuator 42.

FIG. 2 shows a state of the shift range which is now the non-P range. In this state, as parking lock pole 106 does not lock parking gear 108, rotations of the drive shaft of the vehicle cannot be prevented. Starting from this state, actuator 42 rotates shaft 102 in the clockwise direction so that rod 104 is pushed via detent plate 100 in the direction indicated by the arrow A in FIG. 2 and parking lock pole 106 is accordingly pushed up by a tapered portion on an end of rod 104 in the direction indicated by the arrow B in FIG. 2. As detent plate 100 rotates, roller 112 of detent spring 110 that is located in one of depressions on the top of detent plate 100, namely located at a non-P range position 120, climbs over a crest 122 and then down into the other depression, namely a P range position 124. Roller 112 is provided to detent spring 110 in such a manner that the roller is rotatable in the axial direction. When detent plate 100 rotates to such a degree that allows roller 112 to move to P range position 124, parking lock pole 106 is pushed up to a position where pole 106 engages with parking gear 108. In this way, the drive shaft of the vehicle is mechanically fixed and the shift range is switched to the P range.

Shift control system 10 of this embodiment controls, in order to reduce a load on the shift switching mechanism including detent plate 100, detent spring 110 and shaft 102 for example when the shift range is switched, the rotational amount of actuator 42 so that P-ECU 40 lessens impact which occurs when roller 112 of detent spring 110 climbs over crest 122 and then drops.

Figure 3:
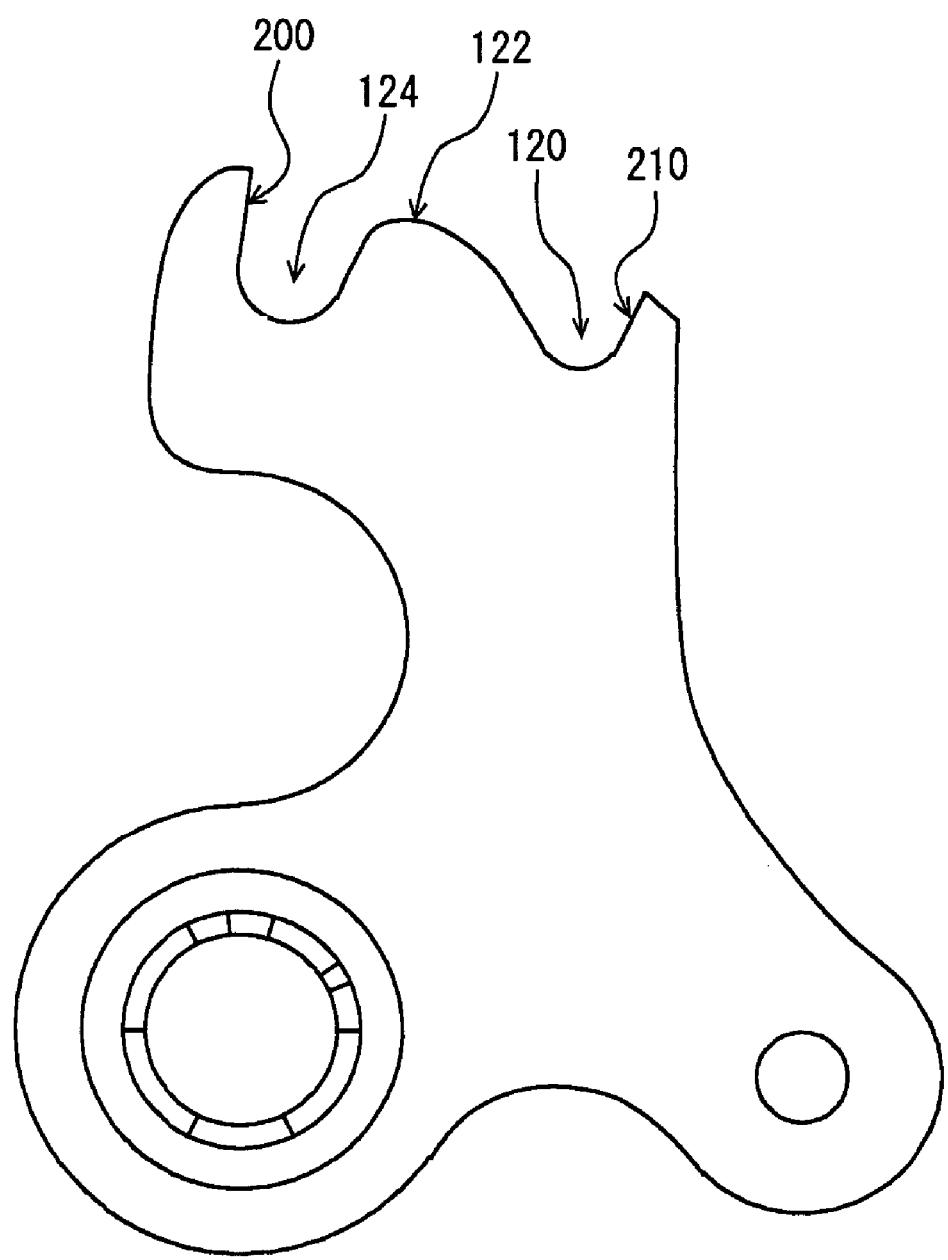
FIG. 3 shows a configuration of a detent plate.

FIG. 3 shows a configuration of detent plate 100. Of the shown two surfaces of each depression that extend from the bottom of the depression, the surface that is located away from crest 122 is called "wall". In other words, the wall is present at a position where the wall hits against roller 112 of detent spring 110 when roller 112 climbing over crest 122 drops onto the bottom of the depression without the control hereinlater described by P-ECU 40. The wall of P range position 124 is called "P wall" and the wall of non-P range position 120 is called "non-P wall". When roller 112 moves from P range position 124 to non-P range position 120, P-ECU 40 controls actuator 42 so that non-P wall 210 does not hit against roller 112. Specifically, P-ECU 40 stops the rotation of actuator 42 at a position which allows non-P wall 210 to stop immediately before hitting against roller 112. This position is called "non-P target rotational position". Moreover, P-ECU 40 controls actuator 42 so that P wall 200 does not hit against roller 112 when roller 112 moves from non-P range position 120 to P range position 124. Specifically, P-ECU 40 stops the rotation of actuator 42 at a position which allows P wall 200 to stop immediately before hitting against roller 112. This position is called "P target rotational position". Under the control of actuator 42 by P-ECU 40, the load exerted in switching the shift range on the shift switching mechanism including detent plate 100, detent spring 110 and shaft 102 for example can remarkably be reduced. By the reduction of the load, the weight and cost of the shift switching mechanism can accordingly be reduced.

Figure 4:
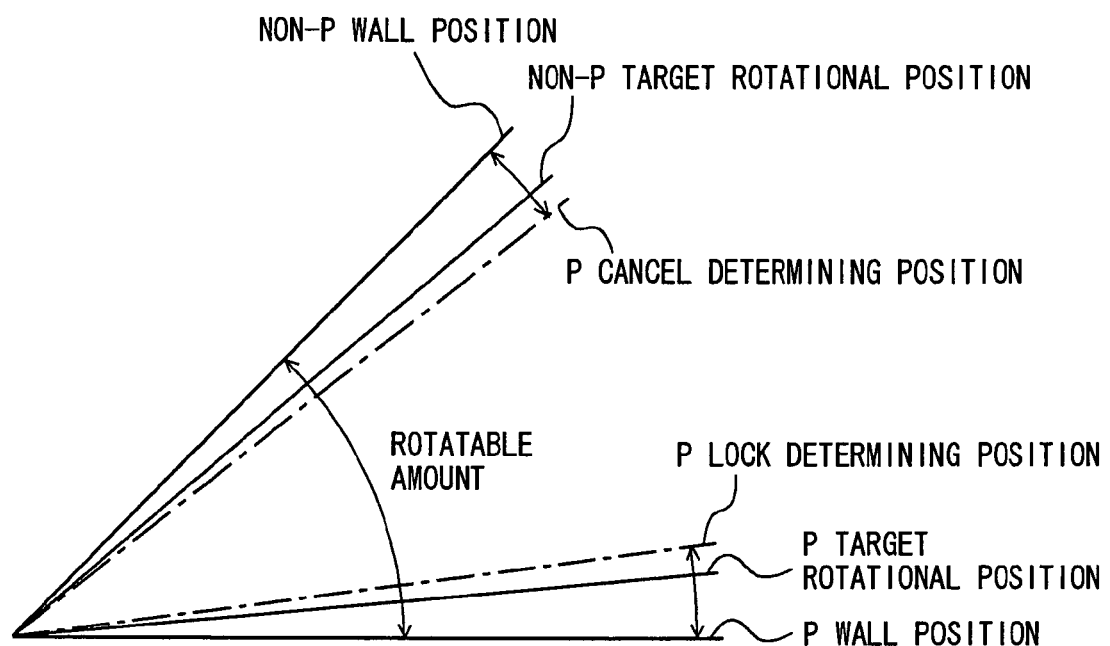
FIG. 4 illustrates a method of controlling an actuator.

FIG. 4 illustrates a method of controlling actuator 42. Actuator 42 causes detent plate 100 to rotate. The rotation of actuator 42 is restricted by P wall 200 and non-P wall 210. In FIG. 4, the position of P wall 200 and the position of non-P wall 210 in controlling the rotation of actuator 42 are conceptually shown. The region between "P wall position" and "non-P wall position" is called "rotatable amount" of actuator 42. The rotatable amount includes "actual rotatable amount" determined from a count value of encoder 46 and "designed rotatable amount" determined by design.

A current shift range is identified when the rotational amount of actuator 42 is in a region between the P wall position or the non-P wall position and a position away from the P or non-P wall position by a predetermined rotational amount. The shift range is determined on the basis of the P lock position (hereinafter P lock determining position) and on the basis of the P cancel position (hereinafter P cancel determining position). The region between the P wall position and the P lock determining position as well as the region between the non-P wall position and the P cancel determining position are defined each as a shift range determining region. Specifically, when the rotational amount of actuator 42 that is detected by encoder 46 is in the region between the P wall position and the P lock determining position, it is determined that the current shift range is the P range. On the other hand, if the rotational amount of actuator 42 is in the region between the non-P wall position and the P cancel determining position, it is determined that the current shift range is the non-P range. Further, if the rotational amount of actuator 42 is in the region between the P lock determining position and the P cancel determining position, it is determined that the shift range is uncertain or the shift range is now being switched. The determinations above are made by P-ECU 40.

The P target rotational position is set between the P wall position and the P lock determining position. The P target rotational position corresponds to the position which allows P wall 200 not to impact against roller 112 of detent spring 110 when the non-P range is switched to the P range and is set with a predetermined margin from the P wall position. This margin is set with an allowance in consideration of backlash due to for example secular changes. Thus, the secular changes can be absorbed until the system is used a certain number of times, and the impact of P wall 200 against roller 112 when the shift range is switched can be avoided.

Similarly, the non-P target rotational position is set between the non-P wall position and the P cancel determining position. The non-P target rotational position corresponds to the position which allows non-P wall 210 not to impact against roller 112 of detent spring 110 when the P range is switched to the non-P range and is set with a predetermined margin from the non-P wall position. This margin is set with an allowance in consideration of backlash due to for example secular changes. Thus, the secular changes can be absorbed until the system is used a certain number of times, and the impact of non-P wall 210 against roller 112 can be avoided when the shift range is switched.

The margin from the non-P wall position and the margin from the P wall position are not necessarily equal to each other and may be different depending on the shape for example of detent plate 100.

The method of controlling actuator 42 is heretofore described on the precondition that the P wall position and the non-P wall position have been detected. The P wall position and the non-P wall position serve as reference positions each for defining the region for determining the shift range and the target rotational position for P range position 124 or non-P range position 120. A description is now given below of a method of controlling the position of actuator 42 using encoder 46 which detects relative positional information, specifically of a method of detecting the wall position serving as the reference position.

P-ECU 40 or V-ECU 30 stores a shift range which was selected when vehicle power switch 28 was lastly turned off. When vehicle power switch 28 is thereafter turned on, P-ECU 40 sets the stored shift range as a current shift range. By wall-position detection control, a wall position for the current shift range is detected. If the last shift range is not stored, V-ECU 30 determines the current shift range based on the vehicle speed. Specifically, if the vehicle speed is a low speed of at most 3 km/h, V-ECU 30 determines that the current shift range is the P range and, if the vehicle speed is a medium-to-high speed higher than 3 km/h, V-ECU 30 determines that the current shift range is the non-P range. If the last shift range is not stored and the vehicle speed is a medium-to-high speed, this state corresponds to a state where the power was momentarily turned off when the vehicle was running and the data on the current shift range was lost. In most cases, however, it is determined that the vehicle speed is a low-speed when vehicle power switch 28 is turned on and accordingly it is determined that the current shift range is the P range.

Figure 5A:
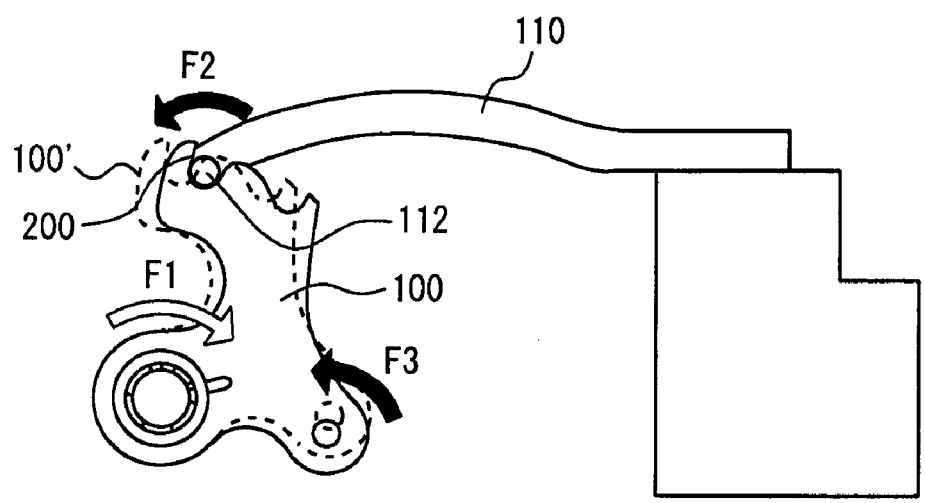
FIG. 5A illustrates a control method for detecting a P wall position and FIG. 5B illustrates a control method for detecting a non-P wall position.

FIG. 5A illustrates a control method for detecting the P wall position. P-ECU 40 functions as rotation control means for rotating actuator 42 as well as position setting means for setting the P wall position, namely reference position, of actuator 42. According to the control method for detecting the P wall position, detent plate 100 is rotated by actuator 42 in the clockwise direction, namely the direction in which P wall 200 moves toward roller 112 of detent spring 110 to cause P wall 200 to contact roller 112. P wall 200 in the P range position functions as restriction means for restricting the clockwise rotation of actuator 42. P wall 200 may constitute the restriction means in cooperation with detent spring 110 and roller 112. In FIG. 5A, the arrow F1 indicates a rotational force of actuator 42, the arrow F2 indicates a spring force of detent spring 110 and the arrow F3 indicates a pushing-back force of rod 104. The dotted line represents a position of detent plate 100' at which P wall 200 and roller 112 contact each other. Therefore, detection of the position of detent plate 100' corresponds to detection of the position of P wall 200.

Even after P wall 200 and roller 112 contact each other, detent plate 100 is rotated from the position indicated by the dotted line, against the spring force of detent spring 110, by the rotational force F1 of actuator 42 in the clockwise direction. Accordingly, detent spring 110 flexes to increase the spring force F2 as well as the pushing-back force F3 of rod 104. When the rotational force F1 is balanced with the spring force F2 and the pushing-back force F3, the rotation of detent plate 100 is stopped.

Whether the rotation of detent plate 100 is stopped or not is determined based on a state of a count value obtained by encoder 46. P-ECU 40 determines that the rotation of detent plate 100 and actuator 42 is stopped if a minimum value or a maximum value of the count value of encoder 46 does not change for a predetermined period of time. Which of the maximum count value and the minimum count value is to be monitored may be determined depending on encoder 46. In any case, the state where the maximum or minimum value is constant for a predetermined period of time means that detent plate 100 is stopped from rotating and thus stationary.

P-ECU 40 detects the position where detent plate 100 is stopped to use this position as "provisional P wall position" and calculates a flexure amount or flexure angle of detent spring 110. The calculation of the flexure amount or flexure angle is done using a map showing a relation of the flexure amount or flexure angle with respect to an applied voltage to actuator 42 that is held in advance in P-ECU 40. From this map, P-ECU 40 calculates the flexure amount or flexure angle corresponding to an applied voltage to actuator 42 when the provisional P wall position is detected. The map may use a battery voltage instead of the applied voltage to actuator 42. The battery voltage is monitored by P-ECU 40 and can readily be detected. In this case, the map is prepared in consideration of a voltage drop due to a wire harness from the battery to actuator 42. P-ECU 40 uses this map to make mapping correction of the provisional P wall position with the calculated flexure amount or flexure angle to finally confirm the mapping-corrected position as the P wall position. By the confirmation of the P wall position, the P lock determining position and the P target rotational position can be set. Instead of the map showing the relation of the flexure amount or flexure angle to the applied voltage, a map may be used that shows a relation of the flexure amount or flexure angle with respect to an output torque of actuator 42. Further, instead of the calculation with the map, a sensor may be used that detects the flexure amount or flexure angle for detecting the wall position.

Figure 5B:
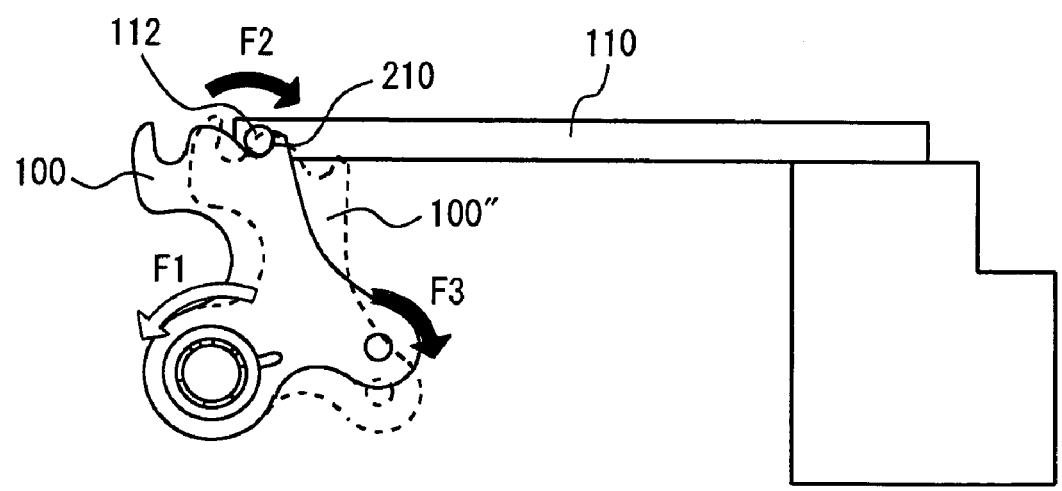

FIG. 5B illustrates a control method for detecting the non-P wall position. P-ECU 40 functions as rotation control means for rotating actuator 42 as well as position setting means for setting the non-P wall position, namely reference position, of actuator 42. According to the control method for detecting the non-P wall position, detent plate 100 is rotated by actuator 42 in the anticlockwise direction, namely the direction in which non-P wall 210 moves toward roller 112 of detent spring 110 to cause non-P wall 210 to contact roller 112. Non-P wall 210 in the non-P range position functions as restriction means for restricting the anticlockwise rotation of actuator 42. Non-P wall 210 may constitute the restriction means in cooperation with detent spring 110 and roller 112. In FIG. 5B, the arrow F1 indicates a rotational force of actuator 42, the arrow F2 indicates a spring force of detent spring 110 and the arrow F3 indicates a pulling force of rod 104. The dotted line represents a position of detent plate 100" at which non-P wall 210 and roller 112 contact each other. Therefore, detection of the position of detent plate 100" corresponds to detection of the position of non-P wall 210.

Even after non-P wall 210 and roller 112 contact each other, detent plate 100 is rotated by the rotational force F1 of actuator 42 in the anticlockwise direction from the position indicated by the dotted line against the pulling force of detent spring 110. Accordingly, detent spring 110 extends to increase the spring force F2 as well as the pulling force F3 of rod 104. When the rotational force F1 is balanced with the spring force F2 and the pulling force F3, the rotation of detent plate 100 is stopped.

Whether the rotation of detent plate 100 is stopped or not is determined based on a count value obtained by encoder

46. Specifically, it is determined that the rotation of detent plate 100 and actuator 42 is stopped if a minimum value or a maximum value of the count value encoder 46 is constant for a predetermined period of time.

P-ECU 40 detects the position where detent plate 100 is stopped to use this position as "provisional non-P wall position" and calculates an amount of the extension of detent spring 110. The calculation of the amount of extension is done using a map showing a relation of the extension amount with respect to an applied voltage to actuator 42 that is held in advance in P-ECU 40. From this map, P-ECU 40 calculates the extension amount corresponding to an applied voltage to actuator 42 when the provisional non-P wall position is detected. P-ECU 40 uses this map to make mapping correction of the provisional non-P wall position with the calculated extension amount to finally confirm the mapping-corrected position as the non-P wall position. By the confirmation of the non-P wall position, the P cancel determining position and the non-P target rotational position can be set. Instead of the map showing the relation of the extension amount to the applied voltage, a map may be used that shows a relation of the extension amount with respect to an output torque of actuator 42. Further, instead of the calculation with the map, a sensor may be used that detects the extension amount for detecting the wall position.

In this way, under the control of detection of the wall position, the wall position for the current shift range is detected. If an actual rotatable amount between the P wall position and the non-P wall position has already been detected, the actual rotatable amount may be used to calculate a wall position for the other shift range. The actual rotatable amount may be detected, by the wall-position detection control to detect a wall position for one of the shift ranges, followed by the wall-position detection control to detect a wall position for the other shift range, and thereby measuring the region between the detected two wall positions. P-ECU 40 stores the measured actual rotatable amount. Once the actual rotatable amount is obtained, P-ECU 40 which has detected a wall position for one shift range can set a wall position for the other shift range as the position distant from the wall position for the one shift range by the actual rotational amount, and accordingly, P-ECU 40 can set the shift range determining region and the target rotational position for the two shift ranges each.

It is seen from the above that the detection of both wall positions for the P range and the non-P range respectively may be done when P-ECU 40 does not store the actual rotatable amount. For example, upon shipment of the vehicle from a factory or if data is lost in P-ECU 40, both of the wall positions are detected. Further, even if the actual rotatable amount is stored, both of the wall positions may be detected each time the shift or a trip is done a predetermined number of times. For example, if the shift range is switched a few ten thousands of times, the backlash amount due to wearing increases, resulting in an error of the actual rotatable amount. In such a case, the actual rotatable amount may newly be measured to detect the wall position and thereby address the problem of secular changes.

FIG. 6 shows exemplary control of detection of the wall position using data stored on a preceding trip. If the shift range when the preceding trip is finished is the P range, the P wall position is first detected and, if the actual rotatable amount has been detected, the non-P wall position is not detected. On the other hand, if the actual rotatable amount is unknown, the non-P wall position is detected. The non-P wall position is detected when the driver instructs to switch the shift range to the non-P range. At this time, P-ECU 40 switches the shift range to the non-P range and causes non-P wall 210 to contact roller 112 of detent spring 110 so as to detect the non-P wall position. After both of the walls are detected, P-ECU 40 measures the actual rotatable amount and stores it.

If the shift range is the non-P range when a preceding trip is completed, the non-P wall position is detected first and, if the actual rotatable amount has been detected, the P wall position is not detected. On the other hand, if the actual rotatable amount is unknown, the P wall position is detected. The P wall position is detected when the driver instructs to switch the shift range to the P range. P-ECU 40 switches the shift range to the P range and causes P wall 200 to contact roller 112 of detent spring 110 so as to detect the P wall position. After both of the wall positions are detected, P-ECU 40 measures and stores the actual rotatable amount.

If the shift range when the preceding trip is completed is unknown, V-ECU 30 determines the current shift range based on the vehicle speed to send an instruction to detect the wall position to P-ECU 40. When it is revealed from this instruction that the curent shift range is set to the P range, P-ECU 40 first detects the P wall position and thereafter detects the non-P wall position in response to a shift instruction from the driver. On the other hand, if it is revealed from the instruction that the curent shift range is set to the non-P range, P-ECU 40 first detects the non-P wall position and thereafter detects the P wall position in response to a shift instruction from the driver.

FIG. 7 illustrates an exemplary method of calculating a target rotational position of actuator 42. The example in FIG. 7 supposes that the count value of encoder 46 is counted up as the actuator rotates from the P wall position toward the non-P wall position. If the P wall position, non-P wall position and actual rotatable amount have been detected, the P target rotational position is set to (P wall position+margin) and the non-P target position is set to (non-P wall position−margin).

If the P wall position has been detected, the non-P wall position is unknown and the actual rotatable amount has been detected, the P target rotational position is set to (P wall position+margin) and the non-P target rotational position is set to (P wall position+actual rotatable amount−margin). If the actual rotatable amount is unknown, the P target rotational position is set to (P wall position+margin) and the non-P target rotational position is set to (P wall position+ designed rotatable amount). Here, the designed rotational amount is set to a certain value in consideration of the margin.

If the P wall position is unknown, the non-P wall position has been detected and the actual rotatable amount has been detected, the P target rotational position is set to (non-P wall position−actual rotational amount+margin) and the non-P target rotational position is set to (non-P wall position−margin). If the actual rotatable amount is unknown, the P target rotational position is set to (non-P wall position−designed rotatable amount) and the non-P target rotational position is set to (non-P wall position−margin).

According to another example, the count value of encoder 46 may be counted up as the actuator rotates from the non-P wall position toward the P wall position. In this case, if the non-P wall position, P wall position and actual rotatable amount have been detected, the non-P target rotational position is set to (non-P wall position+margin) and the P target rotational position is set to (P wall position−margin).

If the non-P wall position has been detected, the P wall position is unknown and the actual rotatable amount has been detected, the non-P target rotational position is set to (non-P wall position+margin) and the P target rotational position is set to (non-P wall position+actual rotatable amount–margin). If the actual rotatable amount is unknown, the non-P target rotational position is set to (non-P wall position+margin) and the P target rotational position is set to (non-P wall position+designed rotatable amount).

If the non-P wall position is unknown, the P wall position has been detected and the actual rotatable amount has been detected, the non-P target rotational position is set to (P wall position–actual rotatable amount+margin) and the P target rotational position is set to (P wall position–margin). If the actual rotatable amount is unknown, the non-P target rotational position is set to (P wall position–designed rotatable amount) and the P target rotational position is set to (P wall position–margin).

Figure 8:
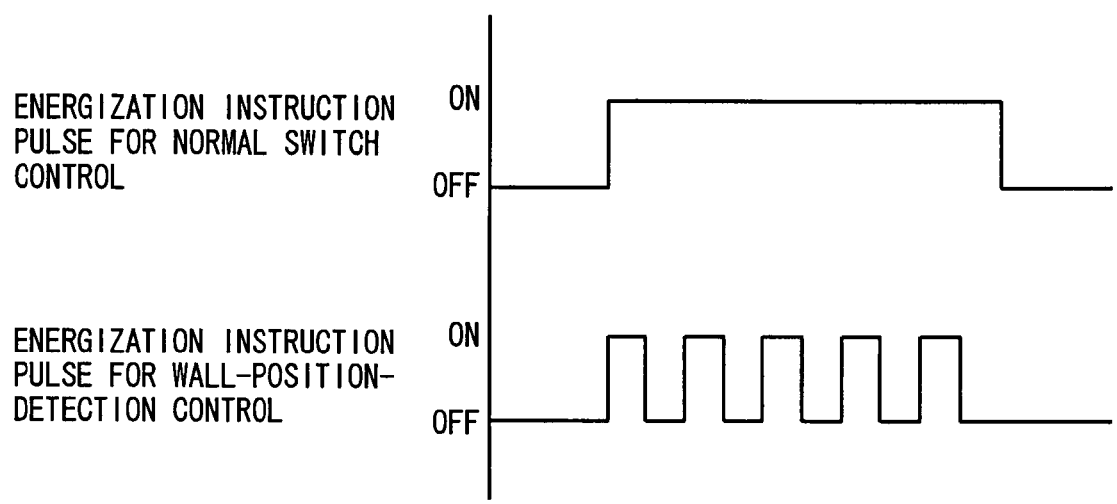
FIG. 8 shows a waveform of each energization instruction pulse applied to the actuator.

FIG. 8 shows a waveform of each energization instruction pulse applied to actuator 42. When the shift range is normally switched, a signal of an energization instruction pulse having a long high period is applied to actuator 42. When the wall-position-detection is controlled, a signal of an energization instruction pulse is applied to actuator 42 so that an output per unit time of actuator 42 when the wall position is detected is smaller than an output per unit time of actuator 42 when the shift range is normally shifted. Specifically, the on-width of the energization instruction pulse applied to actuator 42 is made small. By slowing down the rotational speed of actuator 42 when the wall-position-detection is controlled, impact between the wall and roller 112 can be reduced.

Figure 9:
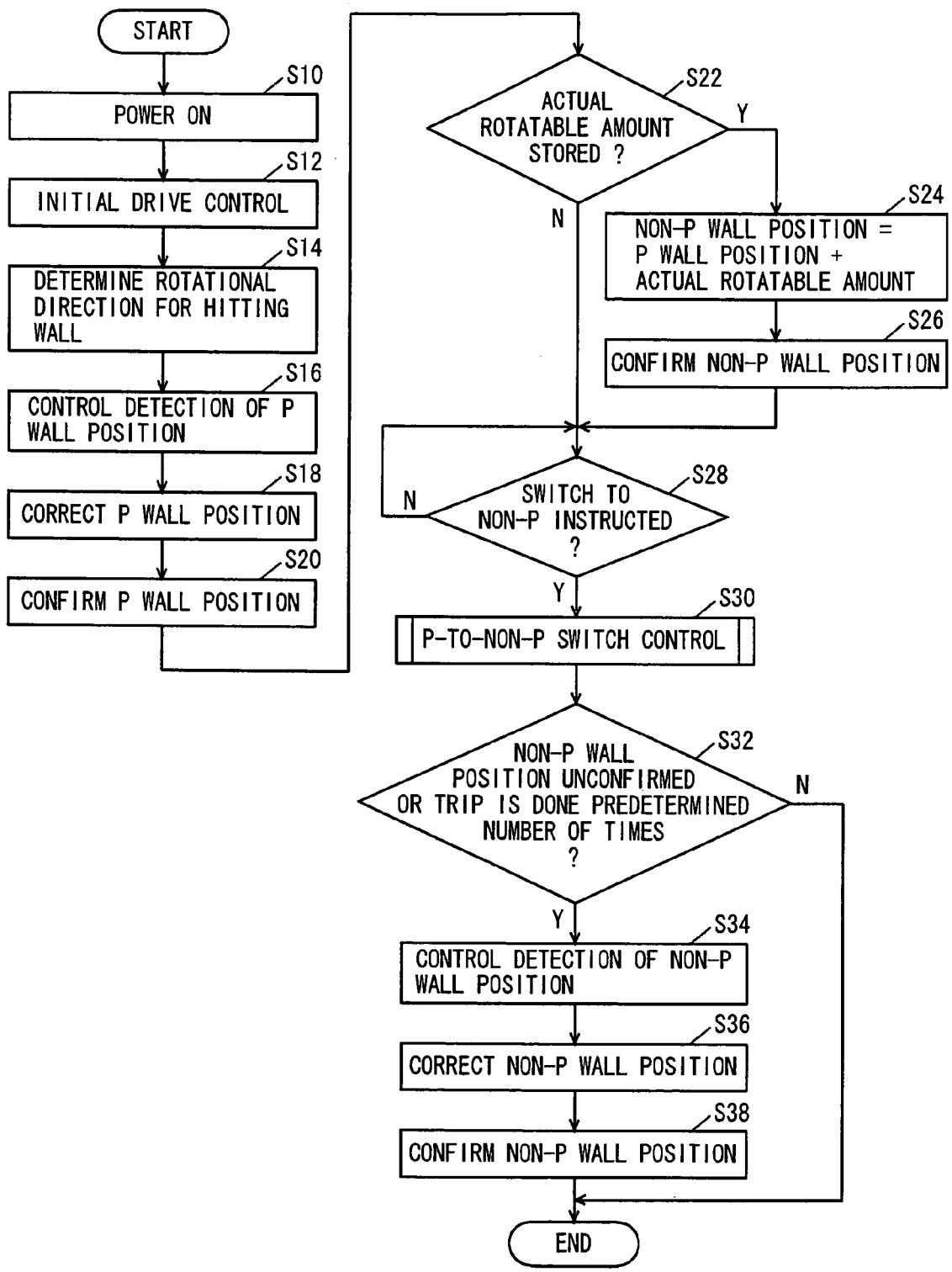
FIG. 9 is a flowchart showing a method of detecting a reference position by the shift control system according to the first embodiment.

FIG. 9 shows a flowchart of a method of detecting the reference position by shift control system 10 in the first embodiment. In this flowchart, it is supposed that the shift range upon power-on is the P range. First, a driver turns on vehicle power switch 28 to power shift control system 10 (S10). Following this, excitation-phase-matching for example of the motor, i.e., actuator 42, is done, to execute initial drive control (S12). By the execution of the initial drive control, the. rotation of actuator 42 can appropriately be controlled. Under the condition that the shift range is the P range, the rotational direction of actuator 42 for hitting the wall against the roller is determined (S14). Specifically, the determined rotational direction of actuator 42 is the direction which allows P wall 200 to hit against roller 112 of detent spring 110.

Based on a state of a count value of encoder 46, control of detection of the P wall position is done to detect the provisional P wall position (S16). The provisional P wall position is corrected with the map (S18), and the corrected position is confirmed as the P wall position (S20). If the actual rotatable amount is stored (Y in S22), the non-P wall position is calculated to be a position of (P wall position+ actual rotatable amount) (S24) to confirm the non-P wall position (S26). In S24, although the non-P wall position is calculated on the precondition that the count value of encoder 46 is counted up as the actuator rotates from the P wall position toward the non-P wall position, the count value may be counted up as the actuator rotates from the non-P wall position toward the P wall position. In the latter case, the non-P wall position is calculated to be a position of (P wall position–actual rotatable amount).

If the actual rotatable amount is not stored (N in S22), it is determined whether or not the driver gives an instruction to switch the shift range to the non-P range (S28). If there is no switch instruction (N in S28), monitoring of the switch instruction is continued. If the switch instruction is given (Y in S28), the P range is accordingly switched to the non-P range (S30).

Figure 10:
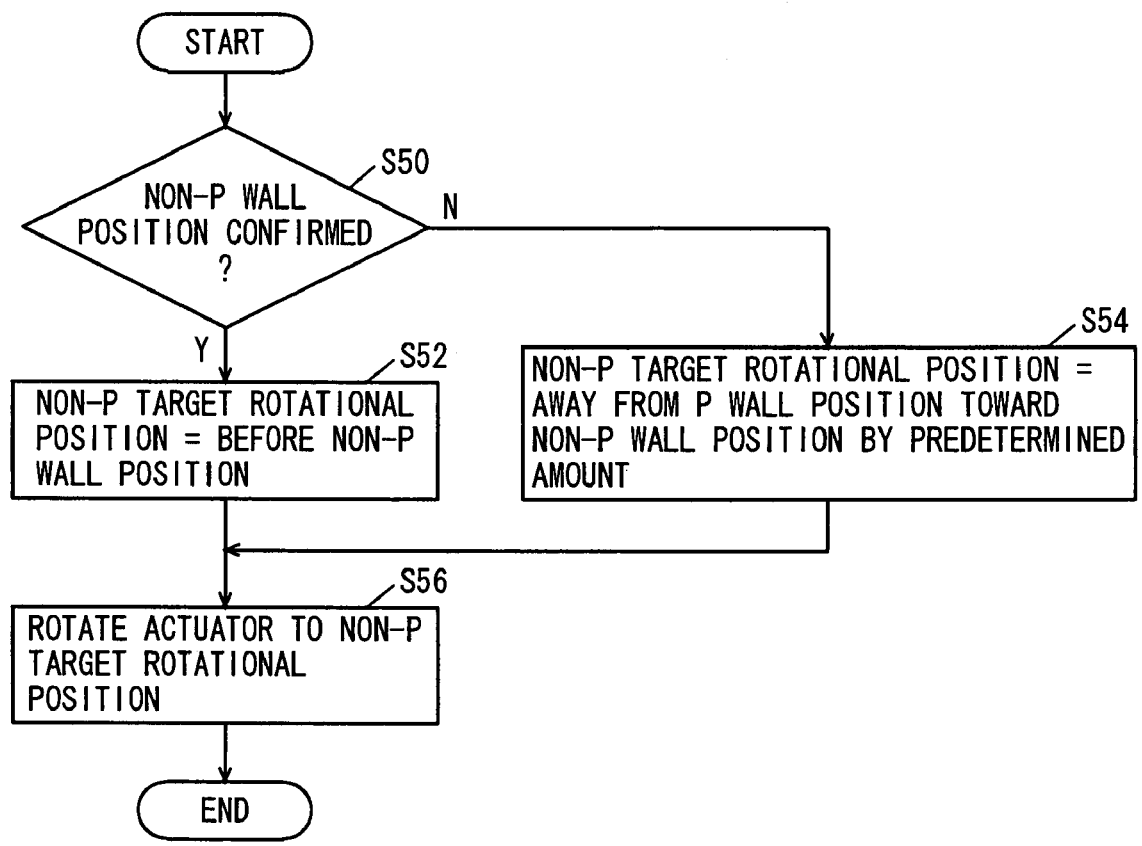
FIG. 10 is a flowchart showing control of switching to the non-P range in step S30 of FIG. 9.

FIG. 10 shows a flowchart of the control of the switch to the non-P range in S30 of FIG. 9. It is first determined whether or not the non-P wall position has been confirmed (S50). If confirmed (Y in S50), the non-P target rotational position is set to a position before the non-P wall position (S52) and actuator 42 is rotated to the non-P target rotational position (S56). In this way, the shift range can be switched to the non-P range without causing non-P wall 210 to contact roller 112 of detent spring 110.

If the non-P wall position has not been confirmed (N in S50), the non-P target rotational position is set to a position away from the P wall position toward the non-P wall position by a predetermined rotational amount (S54). The designed rotatable amount may be used to set the non-P target rotational position. Then, actuator 42 is rotated to the non-P target rotational position (S56).

Referring back to FIG. 9, after the switch control in S30 is completed, it is determined whether the non-P wall position has been unconfirmed, or whether a trip is done a predetermined number of times (S32). If the non-P wall position has been confirmed and the trip is not done the predetermined number of times (N in S32), this flow is ended. If the non-P wall position has been unconfirmed or the trip is done the predetermined number of times (Y in S32), the non-P wall position is detected based on the state of the count value of encoder 46 so as to detect the provisional non-P wall position (S34). The provisional non-P wall position is corrected with the map (S36), and the corrected position is confirmed as the non-P wall position (S38). At this time, from the P wall position and the non-P wall position, the actual rotatable amount is measured. The actual rotatable amount is stored in P-ECU 40 for use in setting the wall position on the next and subsequent trips.

The present invention is heretofore described in connection with the first embodiment. Various modifications of the embodiment are effective. For example, although detent plate 100 herein described has two shift ranges, i.e., P range and non-P range, the detent plate may have a plurality of shift ranges like D range and R range for example. If the detent plate has three or more shift ranges, respective wall positions. corresponding to the outermost shift range positions may be set to the reference positions respectively so that switching of the shift range can suitably be controlled.

Second Embodiment

After the control of the detection of the wall position as described in connection with the first embodiment is completed, if energization is shut off while detent spring 110 is pushed against the wall of detent plate 100 and accordingly flexed or extended or if the energization is stopped due to any failure with detent spring 110 in the above-described state, the recovery force of detent spring 110 causes useless rotation of detent plate 100, possibly resulting in an event that moves the shift position to an undesired position. In order to avoid such an event, the second embodiment rotates, after the wall position is detected, actuator 42 by a predetermined amount from a reference position, namely the wall position, in a direction opposite to the direction in which the rotation is restricted by the wall, so as to cancel the flexure or extension of detent spring 110. The energization is thereafter shut off. The above-described control operation is hereinafter referred to as "return control."

The entire configuration of shift control system 10 of this embodiment is similar to that of shift control system 10 of the first embodiment shown in FIG. 1. The return control of the second embodiment is managed by P-ECU 40. In other words, P-ECU 40 functions as return control means.

Figure 11:
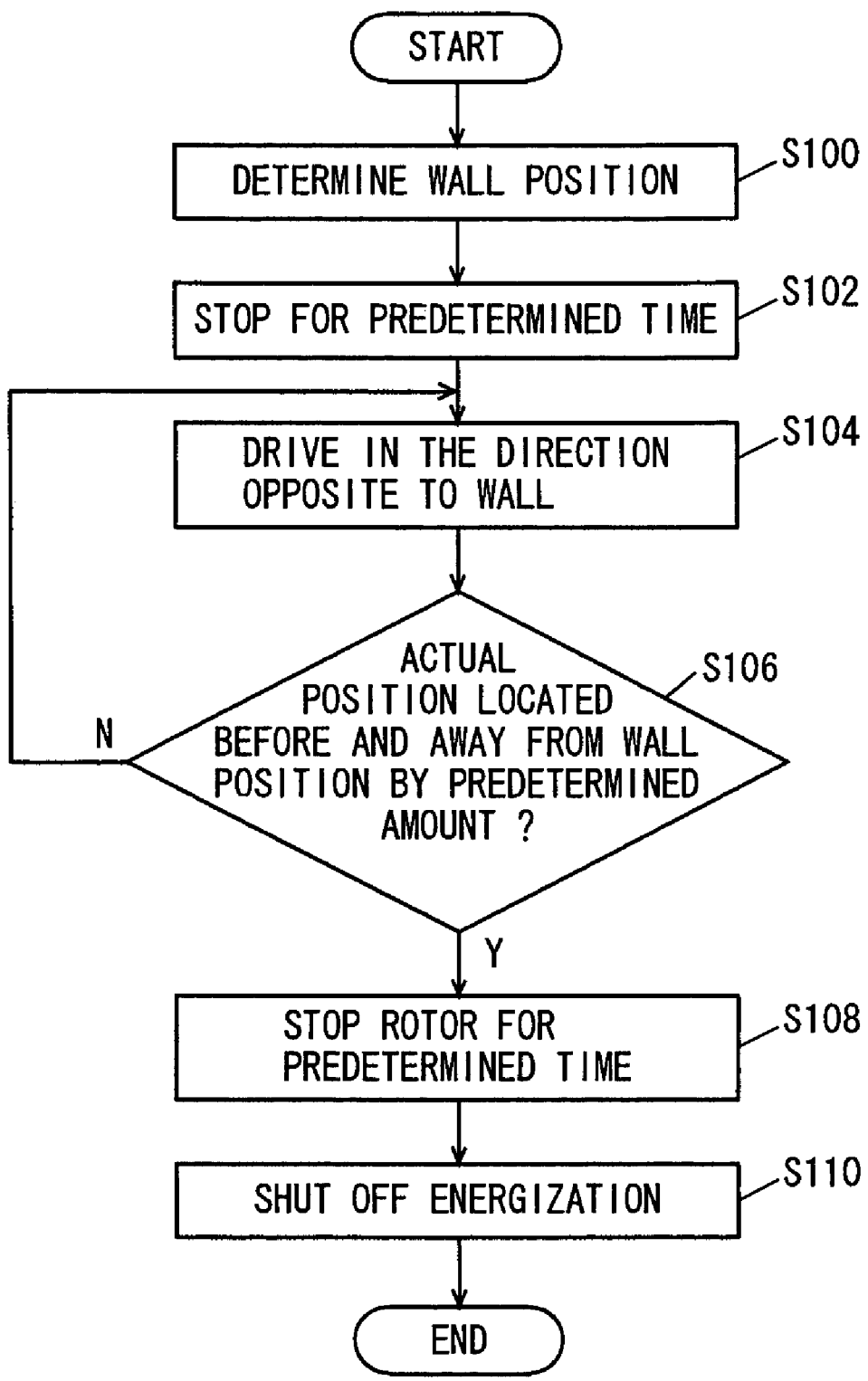
FIG. 11 is a flowchart showing a procedure of return control according to a second embodiment.

FIG. 11 is a flowchart showing a procedure of the return control according to this embodiment. When the wall position is determined by the wall-position detection control described in connection with the first embodiment (S100), roller 112 of detent spring 110 is in a state where roller 112 is pushed against the wall of detent plate 100 to cause detent spring 110 to be flexed or extended. Then, energized phases of actuator 42 are fixed for a predetermined period of time, 50 milliseconds for example, to completely stop actuator 42 (S102). Following this, actuator 42 is driven in the direction opposite to the direction in which the rotation of actuator 42 is restricted by the wall (S104). For example, if the current position is the P wall position, actuator 42 is rotated toward the non-P wall. Until actuator 42 whose position detected by encoder 46 reaches a position before the wall position with a predetermined rotational amount therebetween (N in S106), actuator 42 is rotated (S104). When actuator 42 attains the position before and distant from the wall position by the predetermined rotational amount (Y in S106), energized phases are fixed for a predetermined period of time, 100 milliseconds for example (S108) and then energization is shut off (S110) to wait for a shift-range switch instruction from a user. In this way, actuator 42 can be stopped without flexure or extension of detent spring 110 and such a situation where detent plate 100 is rotated by the recovery force of detent spring 110 can be avoided.

The rotational amount by which the actuator is to be rotated from the reference position toward the other or opposite wall position may be set to the degree that the flexure or extension of detent spring 110 is cancelled. The rotational amount may be set depending on the shape for example of detent plate 100 or detent spring 110 or may be the one corresponding to the target rotational position which is set by the first embodiment. Alternatively, the rotational amount may be the one corresponding to the position between the target rotational position and the wall position for the purpose of accurately determining the shift position, or the one with a greater margin than that of the target rotational position for the purpose of enhancing safety. Depending on the shape for example of detent plate 100, the rotational amount from the P wall and that from the non-P wall may be different. For example, the rotational amount from the P wall may be approximately two degrees toward the non-P wall and the rotational amount from the non-P wall may be approximately three degrees toward the P wall.

If any abnormality occurs in the process of the above-described control of the wall-position detection and that of the return control, or any abnormality has already occurred so that the wall-position detection control and the return control cannot correctly be exercised, subsequent shift control could not be done accurately. For example, if encoder 46 fails in the process of the wall-position detection, the actual position of actuator 42 cannot correctly be detected and thus the wall position could erroneously be determined. Further, if actuator 42 fails in the process of the wall-position detection or the return control, actuator 42 could be pushed back toward the other or opposite wall position due to the recovery force of detent spring 110. Moreover, if encoder 46 fails in the process of the return control, actuator 42 cannot correctly be returned to a predetermined position. Under the situations as described above, the shift range could erroneously be switched or the shift range could erroneously be displayed. Then, in order to avoid this event, any abnormality is accurately detected in the process of the wall-position detection and that of the return control according to a technique as described below.

Figure 12:
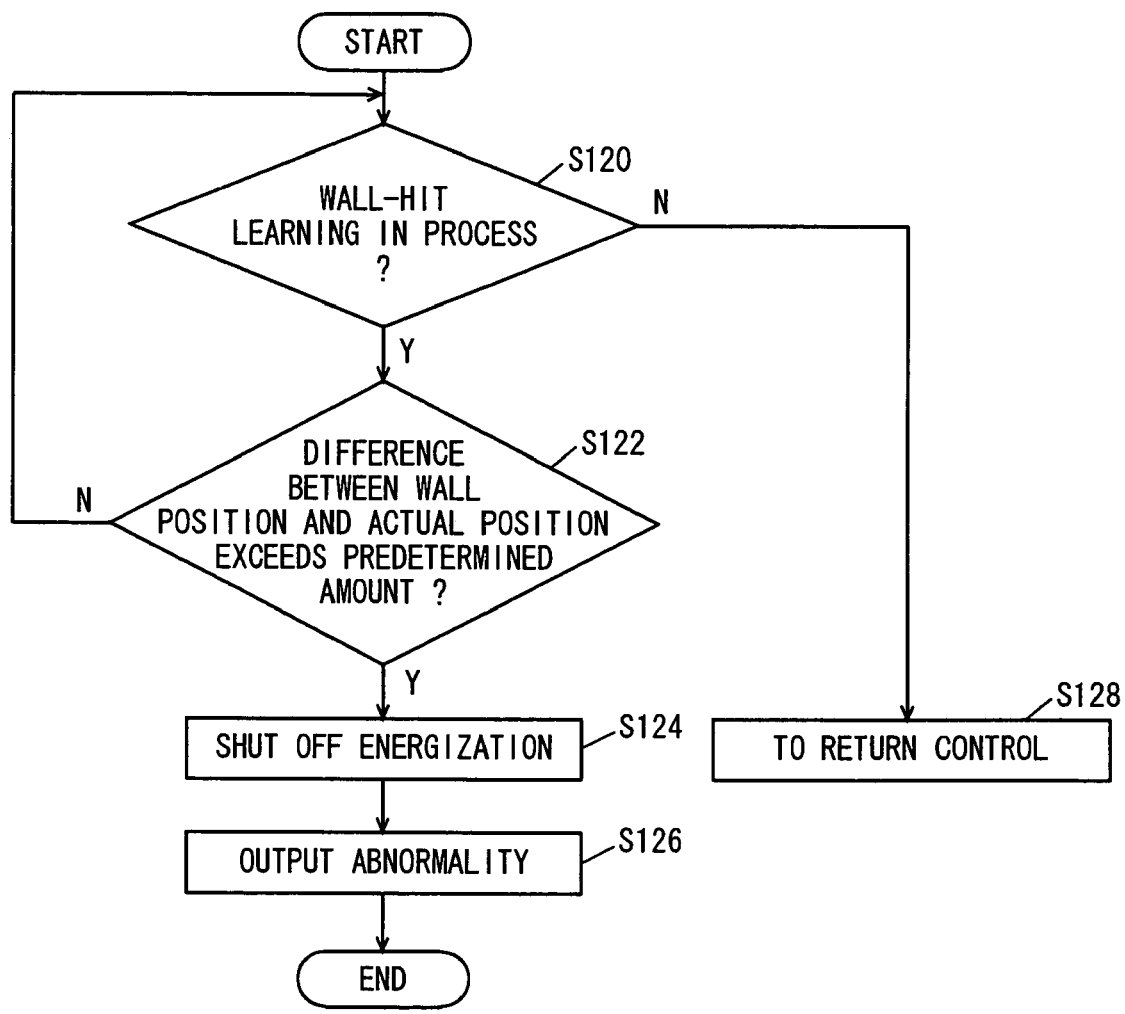
FIG. 12 is a flowchart showing a procedure of a method of detecting a failure in the process of detecting a wall position.

FIG. 12 is a flowchart showing a procedure of a method of detecting an abnormality in the process of controlling the detection of the wall position. In the process of the wall-position detection control (Y in S120), position setting means performs monitoring to find out whether a difference between the wall position and the actual position of actuator 42 detected by encoder 46 exceeds a predetermined amount (S122). In the process of the wall-position detection control, a maximum value of a position signal from encoder 46 that represents the wall position is updated at any time if actuator 42 is rotated in the direction which allows encoder 46 to count up and, a minimum value thereof is updated at any time if actuator 42 is rotated in the opposite direction. If the control is normally done, the wall position and the actual position are almost the same. However, if the position signal is not normally output due to some failure of encoder 46 or if actuator 42 is rotated in the opposite direction by the recovery force of detent spring 110 due to break in actuator 42 to stop energization thereto, the difference between the wall position and the actual position increases. When this difference exceeds a predetermined amount (Y in S122), it is determined that an abnormality occurs to shut off energization to actuator 42 (S124) and output an abnormality warning for informing the user of the abnormality (S126). The predetermined amount is set to enable a determination to be made that actuator 42 is apparently returned in the direction opposite to the current shift range. The above-described monitoring is continued until the control of the wall-position detection is completed. When the wall-position detection control is completed (N in S120), the return control is subsequently done (S128).

Figure 13:
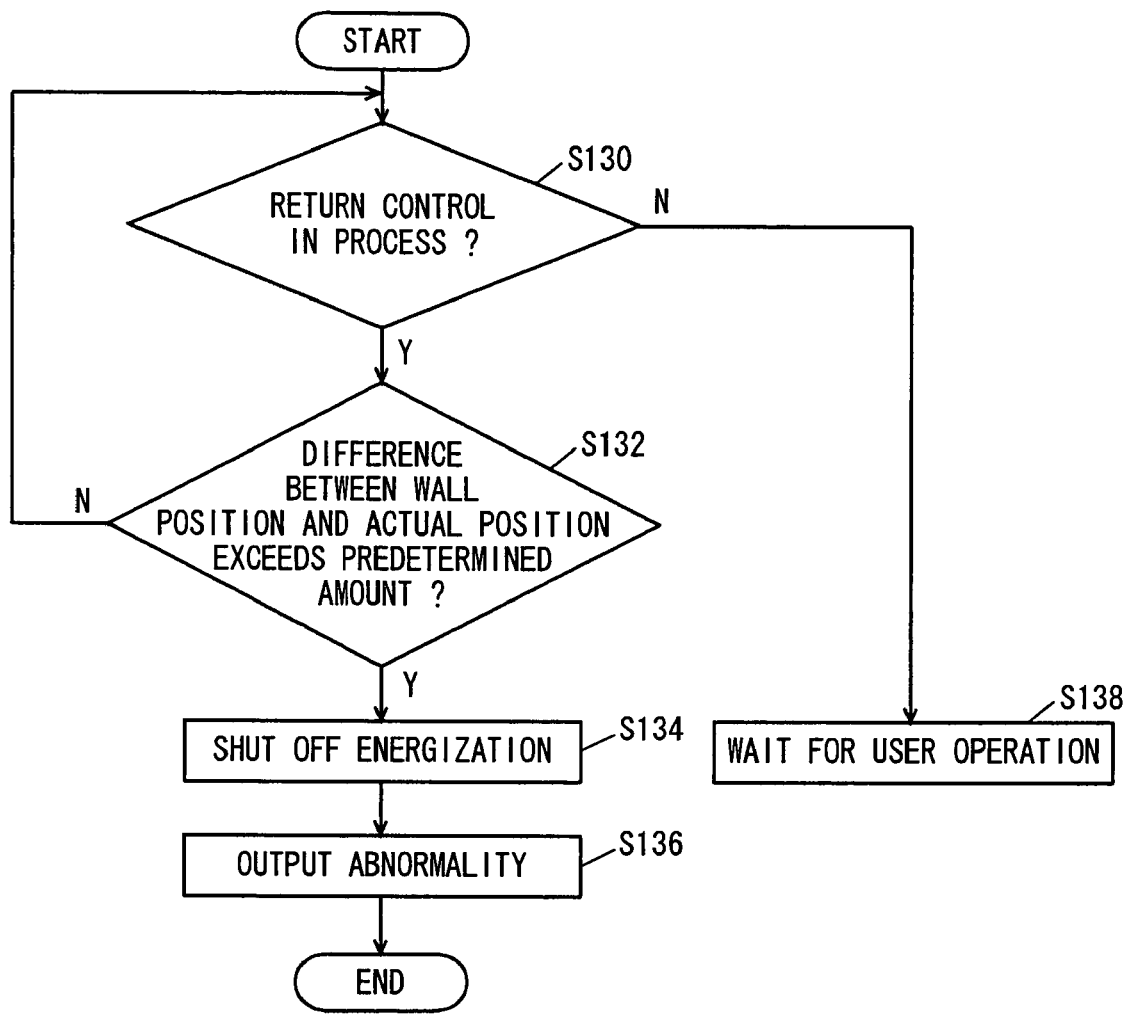
FIG. 13 is a flowchart showing a procedure of a method of detecting a failure in the process of the return control.

FIG. 13 is a flowchart showing a procedure of a method of detecting an abnormality in the return control process. In the process of the return control (Y in S130), return control means performs monitoring to find out whether a difference between the wall position and the actual position of actuator 42 detected by encoder 46 exceeds a predetermined amount (S132). Here, since the wall position has already been determined under the control of the wall-position detection described above, the difference between the determined wall position and the actual position of actuator 42 is monitored. When actuator 42 is being returned to a predetermined position in the direction opposite to the current shift range, if actuator 42 is returned by an amount greater than the predetermined amount due to break for example of actuator 42 (Y in S132), it is determined that an abnormality occurs to shut off energization to actuator 42 (S134) and output an abnormality warning for informing the user of the abnormality (S136). This predetermined amount is set to enable a determination to be made that actuator 42 is apparently returned toward the direction opposite to the current shift range to go beyond the predetermined position. The monitoring is continued until the return control is completed. After the return control is finished (N in S130), a shift-range switch instruction given by user's operation is waited for (S138).

Figure 14:
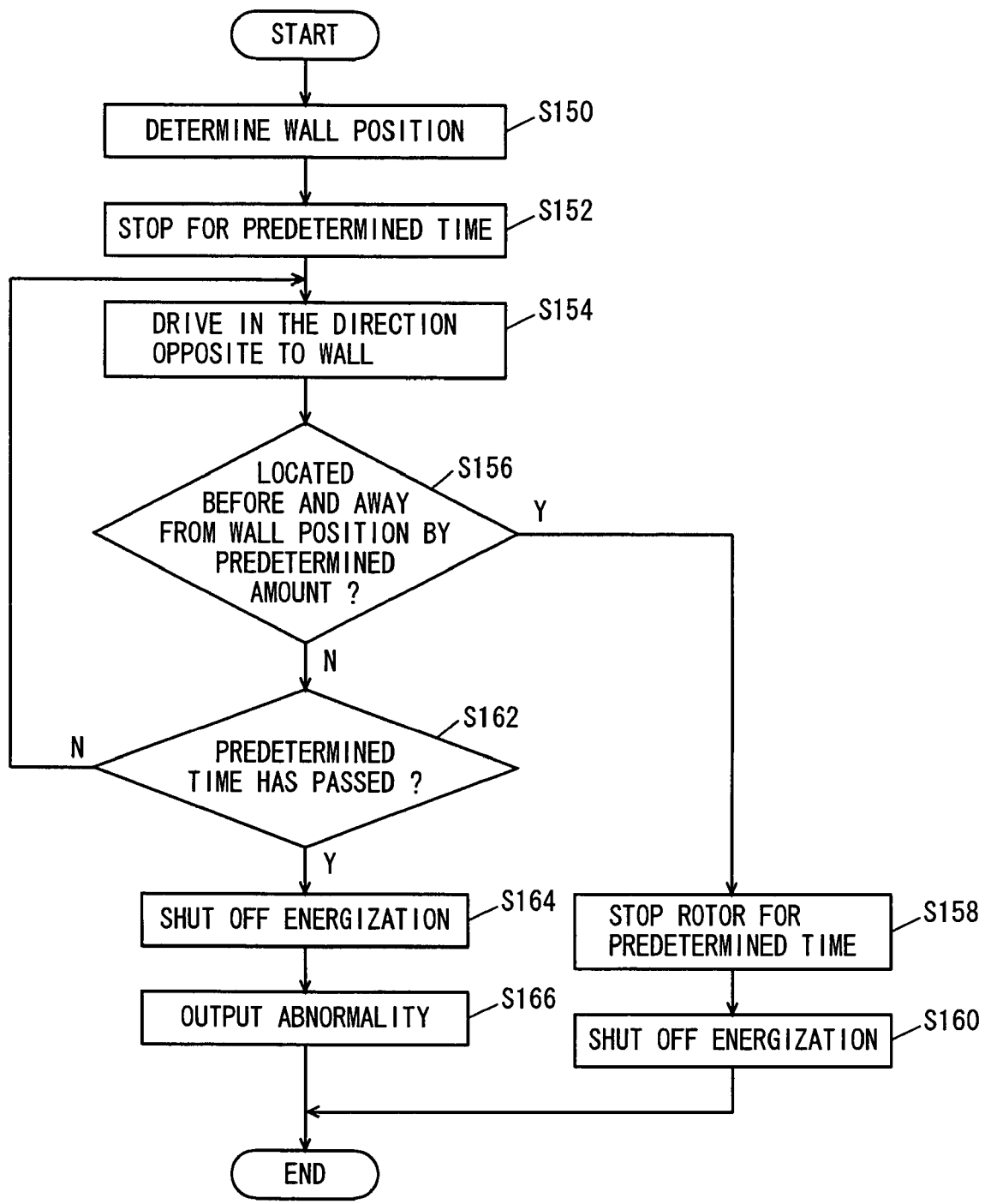
FIG. 14 is a flowchart showing a procedure of another method of detecting a failure in the process of the return control.

FIG. 14 is a flowchart showing a procedure of another method of detecting a failure in the return control process. The wall position is determined by the wall-position detection control described in connection with the first embodiment (S150), and then phases of actuator 42 are fixed for a predetermined period of time to completely stop actuator 42 (S152). Following this, actuator 42 is driven in the direction opposite to the direction in which actuator 42 is restricted by the wall (S154). For example, if the current position is close to the P wall position, actuator 42 is driven toward the non-P wall. When the position of actuator 42 that is detected by encoder 46 reaches a position located before and distant from the wall position by a predetermined amount (Y in S156), energized phases are fixed for a predetermined period of time for the purpose of completely stopping actuator 42 (S158). After this, the energization is shut off (S160) and the return control is completed. If actuator 42 has not attained the position before and distant from the wall position by the predetermined amount (N in S156), it is determined whether or not a predetermined period of time has passed (S162). If not (NO in S162), actuator 42 is further driven in the direction opposite to the wall position (S154). If actuator 42 does not reach the position before the wall position by the predetermined amount even when the predetermined time has passed (Y in S162), it is determined that an abnormality occurs to shut off energization to actuator 42 (S164) and output an abnormality warning for the purpose of informing the user of the abnormality (S166). A reason for the occurrence of the state where actuator 42 has not attained the position before and away from the wall position by the predetermined amount even when the predetermined time has passed is, for example, that the actual position is erroneously detected due to a failure of encoder 46 even if the actuator actually reaches the predetermined position, or that actuator 42 does not rotate due to a failure of actuator 42. The abnormalities can thus be detected accurately by the above-described method.

Figure 15:
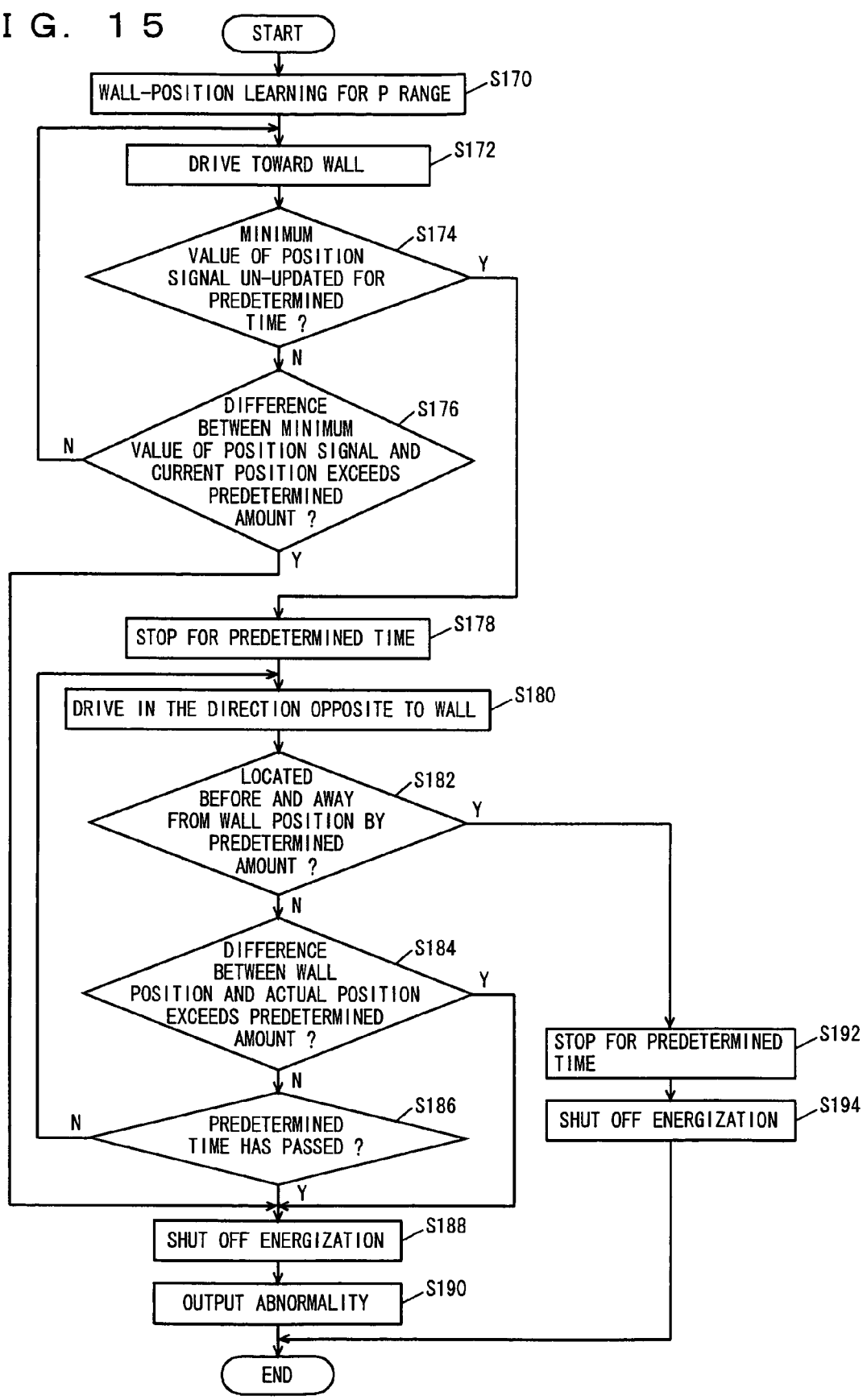
FIG. 15 is a flowchart showing a series of procedures from the start of the wall-position detection control to the end of the return control.

FIG. 15 is a flowchart showing a series of procedures from the start of the wall-position detection control to the end of the return control. This flowchart shows the entire flow including the wall-position detection control described in connection with the first embodiment and the return control described in connection with the second embodiment to which the procedure of detecting an abnormality described with reference to FIGS. 12–14 is added. Although a description is given here of the detection of the wall position for the P range under the wall-position detection control, the same is applied to the detection of the wall position for the non-P range.

In order to detect the wall position for the P range (S170), actuator 42 is driven toward the P wall (S172). When a minimum value of a position signal output from encoder 46 is not updated for a predetermined period of time (Y in S174), the current position is determined as a provisional P wall position and the P wall position is then determined by the method as described with the first embodiment. It is noted here that if the count value of encoder 46 is counted up as the actuator is driven from the P wall position toward the non-P wall position, the provisional P wall position is detected based on the fact that the minimum value of the position signal is not updated for a predetermined period of time. In contrast, if the count value of encoder 46 is counted up as the actuator is driven from the non-P wall position toward the P wall position, the provisional P wall position is detected based on the fact that a maximum value of the position signal is not updated for a predetermined period of time. Then, if the minimum value of the position signal is updated (N in S174), monitoring is done to find out whether or not the difference between the minimum value of the position signal and the current position of actuator 42 exceeds a predetermined amount (S176). If the difference exceeds the predetermined amount, it is determined that an abnormality occurs to shut off energization to actuator 42 (S188) and output an abnormality warning (S190). If the difference between the minimum value of the position signal and the current position of actuator 42 is within the predetermined amount (N in S176), actuator 42 is driven continuously in the P wall direction until the position is detected that allows the minimum value of the position signal not to be updated for the predetermined period of time (S172).

When actuator 42 is stopped while detent spring 110 is flexed to the maximum degree and the P wall position is normally detected, the return control is subsequently done. First, energized phases of actuator 42 are fixed for a predetermined period of time to completely stop actuator 42 (S178). Then, actuator 42 is driven in the direction opposite to the P wall (S180). When the position of actuator 42 detected by encoder 46 attains a position before and distant from the wall position by a predetermined amount therebetween (Y in S182), energized phases are fixed for a predetermined period of time for completely stopping actuator 42 (S192). Then, energization is shut off (S194) and the return control is normally completed. Before the current position of actuator 42 reaches the position before and distant from the wall position by a predetermined amount (N in S182), monitoring is done to find out whether the difference between the wall position and the current position of actuator 42 exceeds a predetermined amount (S184) and monitoring is also done to see whether a predetermined time has passed (S186). When one of the above situations is detected (Y in S184 or Y in S186), it is determined that an abnormality occurs to shut off energization to actuator 42 (S188) and output an abnormality warning (S190). If no abnormality is detected, actuator 42 is driven in the non-P wall direction until the current position of actuator 42 reaches the position before and away from the wall position by the predetermined amount (S180). With the above-described method, any abnormality can appropriately be detected in the process of the wall-position detection control and that of the return control.

The present invention has heretofore been described in connection with its embodiments. The present invention, however, is not limited to these embodiments and various modifications thereof are effective. For example, the second embodiment is described in connection with the example that the return control is done subsequent to the wall-position detection control. The return control, however, may be done after another control in which any flexure or extension of detent spring 110 could be found.

Other Embodiments

From the first embodiment, the following invention for example would be understood.

(1) A shift control system switching a shift range via an actuator includes shift means, a detent plate for example, driven by the actuator for switching the shift range, restriction means, a wall of the detent plate for example, for restricting rotation in a predetermined direction of the actuator in a predetermined shift range, rotation control means, a P-ECU for example, for rotating the actuator, count means, an encoder for example, for obtaining a count value according to a rotational amount of the actuator, and position setting means, the P-ECU for example, for setting, when the actuator is rotated by the rotation control means in the direction in which rotation of the actuator is restricted by the restriction means, a reference position of the actuator corresponding to the predetermined shift range based on a state of the count value obtained by the count means. The shift means and the restriction means may be integrated into one structure, or the restriction means may be a part of the shift means.

With the shift control system, rotation of the actuator is restricted by the restriction means, the state of restriction is determined from the count value of the count means so as to determine the reference position of the actuator. Accordingly, even if an encoder which can obtain only relative positional information is employed in this system, rotation of the actuator can appropriately be controlled based on the reference position. Thus, any load exerted as the actuator rotates can be reduced and the shift range can suitably be switched by the shift means. Moreover, since no potentiometer detecting an absolute position is necessary, the cost can be reduced. The position setting means may set the reference position of the actuator by detecting a state where a minimum value or a maximum value of the count value obtained by the count means is constant for a predetermined period of time.

(2) The position setting means may set a reference position of the actuator corresponding to another shift range different from the predetermined shift range, based on a rotatable amount of the actuator between the predetermined shift range and that another shift range. In this way, the reference position of the actuator corresponding to another shift range can readily be set using the rotatable amount.

(3) The position setting means may set, when the shift means switches the predetermined shift range to another shift range, a reference position of the actuator corresponding to that another shift range. In this way, the reference position of the actuator corresponding to another shift range can efficiently be set at the timing at which the shift range is switched.

(4) The position setting means may set a reference position of the actuator corresponding to another shift range at a predetermined timing in order to correct a secular change of the shift means or the restriction means. The predetermined timing, for example, refers to the timing when the shift range is switched a predetermined number of times or the timing when a trip of a vehicle having this shift control system mounted thereon is done a predetermined number of times. In this way, any secular change can be corrected to accurately set two reference positions. Here, one trip may be defined as a period from turning-on of a vehicle power switch to turning-off thereof or from actual power-on of the vehicle to actual power-off thereof.

(5) The position setting means may detect a rotatable amount of the actuator based on the reference position corresponding to the predetermined shift range and the reference position corresponding to that another shift range. In this way, the rotatable amount is obtained and, on the subsequent trip, the reference position of the actuator for one shift range may be detected to readily detect the reference position of the actuator for the other shift range.

(6) The rotation control means may make smaller an output per unit time of the actuator driven for setting the reference position of the actuator than an output per unit time of the actuator driven for switching the shift range. Accordingly, any load exerted on the shift means or the restriction means can be reduced when the reference position is set.

(7) The position setting means may set, based on the reference position, a target rotational position, to be attained when the shift range is switched, of the actuator in the shift range with the reference position being set. The rotation control means may adjust, when the shift range is switched, the rotational amount of the actuator to allow the actuator to attain the target rotational position by rotating the actuator to drive the shift means.

(8) A shift control method for switching a shift range via an actuator is provided. This method is characterized in that it includes the steps of rotating, by the actuator, shift means for switching the shift range, stopping rotation of the actuator by restriction means for restricting rotation in a predetermined direction of the actuator in a predetermined shift range, detecting a reference position corresponding to the predetermined shift range based on a position where the stopping is effected, and determining, based on the reference position, a target rotational position when the shift range is switched by the actuator. With the above shift control method, the rotation of the actuator is stopped by the restriction means, the reference position of the actuator is detected based on the position where the stopping is effected, and the target rotational position can thus be determined based on the reference position. Accordingly, the actuator can be controlled appropriately to reach the target rotational position and the shift range can suitably be switched using the shift means.

It is seen from the above that the invention as described in paragraphs (1) to (8) and the invention understood from the second embodiment may arbitrarily be combined to attain an invention which is effective as the present invention.

According to the present invention as heretofore discussed, the shift control system and the shift control method by which the shift position can more reliably be determined are provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A shift control system switching a shift range via an actuator, comprising:
    shift means driven by said actuator for switching the shift range, said shift means including a detent plate rotated by said actuator and a detent spring engaging with a depression of said detent plate that is formed correspondingly to a shift range and thereby fixing a shift position;
    rotation control means for rotating said actuator; and
    return control means for rotating, when said actuator is rotated by said rotation control means in the direction in which flexure or extension of said detent spring occurs, said actuator by a predetermined amount from a reference position of said actuator corresponding to a predetermined shift range, in a direction in which the flexure or extension of said detent spring is cancelled.

2. The shift control system according to claim 1, wherein said return control means includes means for rotating said actuator to a position which allows flexure or extension of said detent spring to be cancelled.

3. The shift control system according to claim 2, wherein said return control means includes means for detecting an abnormality, when said actuator is rotated by the predetermined amount from the reference position, from the fact that said actuator is rotated by more than the predetermined amount.

4. The shift control system according to claim 1, wherein said return control means includes means for detecting an abnormality, when said actuator is rotated by the predetermined amount from the reference position, from the fact that said actuator is rotated by more than the predetermined amount.

5. A shift control system switching a shift range via an actuator, comprising:
    shift means driven by said actuator for switching the shift range, said shift means including a detent plate rotated by said actuator and a detent spring engaging with a depression of said detent plate that is formed correspondingly to a shift range and thereby fixing a shift position;

rotation control means for rotating said actuator;

count means for obtaining a count value according to a rotational amount of said actuator;

position setting means for setting, when said actuator is rotated by said rotation control means in the direction in which flexure or extension of said detent spring occurs, a reference position of said actuator corresponding to the predetermined shift range based on a state of said count value obtained by said count means; and return control means for rotating, after said reference position is set by said position setting means, said actuator by a predetermined amount from the reference position, in a direction in which the flexure or extension of said detent spring is cancelled.

6. The shift control system according to claim 5, wherein said return control means includes means for rotating said actuator to a position which allows flexure or extension of said detent spring to be cancelled.

7. The shift control system according to claim 6, wherein said position setting means includes means for detecting an abnormality, when said actuator is rotated by said rotation control means in setting said reference position, from the fact that said actuator is returned in the opposite direction by more than the predetermined amount.

8. The shift control system according to claim 7, wherein said return control means includes means for detecting an abnormality, when said actuator is rotated by the predetermined amount from the reference position, from the fact that said actuator is rotated by more than the predetermined amount.

9. The shift control system according to claim 6, wherein said return control means includes means for detecting an abnormality, when said actuator is rotated by the predetermined amount from the reference position, from the fact that said actuator is rotated by more than the predetermined amount.

10. The shift control system according to claim 5, wherein said position setting means includes means for detecting an abnormality, when said actuator is rotated by said rotation control means in setting said reference position, from the fact that said actuator is returned in the opposite direction by more than the predetermined amount.

11. The shift control system according to claim 10, wherein said return control means includes means for detecting an abnormality, when said actuator is rotated by the predetermined amount from the reference position, from the fact that said actuator is rotated by more than the predetermined amount.

12. The shift control system according to claim 5, wherein said return control means includes means for detecting an abnormality, when said actuator is rotated by the predetermined amount from the reference position, from the fact that said actuator is rotated by more than the predetermined amount.

13. The shift control system according to any one of claims 1–12, wherein said return control means includes means for detecting an abnormality, when said actuator is rotated by the predetermined amount from the reference position under return control, from the fact that the return control is not finished even after a predetermined period of time.

14. A shift control method for switching a shift range via an actuator, comprising the steps of:

rotating, by said actuator, a detent plate for switching the shift range;

stopping rotation of said actuator in a predetermined direction in a predetermined shift range by a detent spring engaging with a depression of said detent plate that is formed correspondingly to a shift range and thereby fixing a shift position;

detecting a reference position corresponding to the predetermined shift range based on a position where said stopping is effected; and rotating said actuator by a predetermined amount in the opposite direction.

15. A shift control system switching a shift range via an actuator, comprising:

a shift component driven by said actuator for switching the shift range, said shift means including a detent plate rotated by said actuator and a detent spring engaging with a depression of said detent plate that is formed correspondingly to a shift range and thereby fixing a shift position;

a rotation control unit for rotating said actuator; and a return control unit for rotating, when said actuator is rotated by said rotation control unit in the direction in which flexure or extension of said detent spring occurs, said actuator by a predetermined amount from a reference position of said actuator corresponding to a predetermined shift range, in a direction in which the flexure or extension of said detent spring is cancelled.

16. The shift control system according to claim 15, wherein said return control unit rotates said actuator to a position which allows flexure or extension of said detent spring to be cancelled.

17. The shift control system according to claim 16, wherein said return control unit detects an abnormality, when said actuator is rotated by the predetermined amount from the reference position, from the fact that said actuator is rotated by more than the predetermined amount.

18. The shift control system according to claim 15, wherein said return control unit detects an abnormality, when said actuator is rotated by the predetermined amount from the reference position, from the fact that said actuator is rotated by more than the predetermined amount.

19. A shift control system switching a shift range via an actuator, comprising:

a shift component driven by said actuator for switching the shift range, said shift means including a detent plate rotated by said actuator and a detent spring engaging with a depression of said detent plate that is formed correspondingly to a shift range and thereby fixing a shift position;

a rotation control unit for rotating said actuator;

a count unit for obtaining a count value according to a rotational amount of said actuator;

a position setting unit for setting, when said actuator is rotated by said rotation control unit in the direction in which flexure or extension of said detent spring occurs, a reference position of said actuator corresponding to the predetermined shift range based on a state of said count value obtained by said count unit; and a return control unit for rotating, after said reference position is set by said position setting unit, said actuator by a predetermined amount from the reference position, in a direction in which the flexure or extension of said detent spring is cancelled.

20. The shift control system according to claim 19, wherein
said return control unit rotates said actuator to a position which allows flexure or extension of said detent spring to be cancelled.

21. The shift control system according to claim 20, wherein
said position setting unit detects an abnormality, when said actuator is rotated by said rotation control unit in setting said reference position, from the fact that said actuator is returned in the opposite direction by more than the predetermined amount.

22. The shift control system according to claim 21, wherein
said return control unit detects an abnormality, when said actuator is rotated by the predetermined amount from the reference position, from the fact that said actuator is rotated by more than the predetermined amount.

23. The shift control system according to claim 20, wherein
said return control unit detects an abnormality, when said actuator is rotated by the predetermined amount from the reference position, from the fact that said actuator is rotated by more than the predetermined amount.

24. The shift control system according to claim 19, wherein
said position setting unit detects an abnormality, when said actuator is rotated by said rotation control unit in setting said reference position, from the fact that said actuator is returned in the opposite direction by more than the predetermined amount.

25. The shift control system according to claim 24, wherein
said return control unit detects an abnormality, when said actuator is rotated by the predetermined amount from the reference position, from the fact that said actuator is rotated by more than the predetermined amount.

26. The shift control system according to claim 19, wherein said return control unit detects an abnormality, when said actuator is rotated by the predetermined amount from the reference position, from the fact that said actuator is rotated by more than the predetermined amount.

27. The shift control system according to any one of claims 15–26, wherein
said return control unit detects an abnormality, when said actuator is rotated by the predetermined amount from the reference position under return control, from the fact that the return control is not finished even after a predetermined period of time.

* * * * *